UNITED STATES PATENT OFFICE.

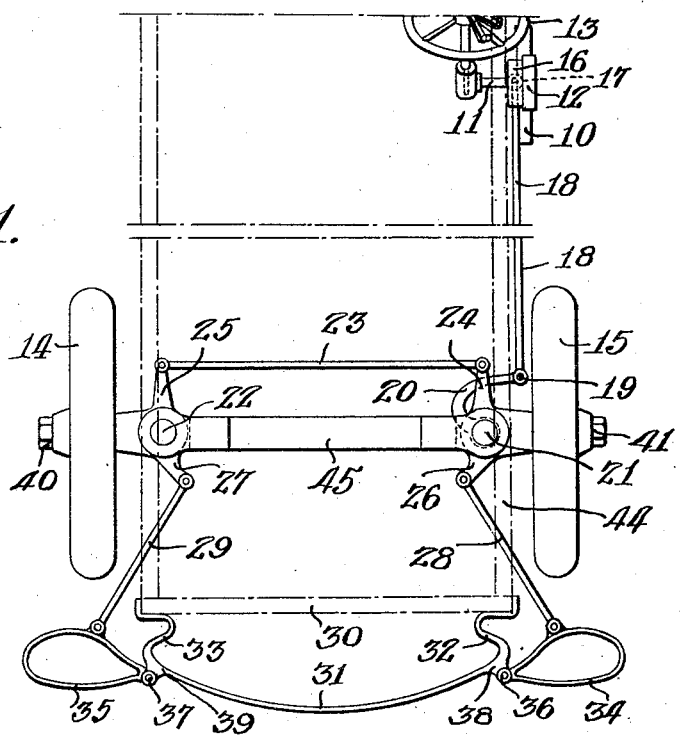

JOSEPH HOFFMAN, OF CAMDEN, NEW JERSEY.

AUTOMOBILE BUMPER WINGS.

1,416,468.  Specification of Letters Patent.  Patented May 16, 1922.

Application filed June 21, 1921. Serial No. 479,269.

*To all whom it may concern:*

Be it known that JOSEPH HOFFMAN, a citizen of the United States, residing at Camden, in the county of Camden and State of New Jersey, has invented certain new and useful Improvements in Automobile Bumper Wings, of which the following is a specification.

My invention relates to flexible bumper wings for automobiles.

The primary object of the invention is to provide a bumper with flexible wings, on an automobile, in conjunction with a steering controlling mechanism as fully described and illustrated in Letters Patent #1,350,285 issued to Philip A. Weigel, inventor, August 17th, 1920 and in an application for patent filed by me in the United States Patent Office June 15, 1921, Serial No. 477,693, whereby injury to the car, by reason of contact with a pole, fire plug, or other obstruction that may be encountered at the street curb or in the roadway, or contact with another car approaching from an opposite direction, is prevented; the flexible bumper wings of my device being rod-connected to the knuckle joints of the axle of the front wheels, so that when an obstacle is encountered said wings move rearwardly causing the front wheels of the car to move inwardly and away from the obstruction.

The stress of the impact will be transmitted to the steering controlling mechanism which will give a cushion effect to the shock from the impact and will also return the front wheels and bumper wings to their normal positions after the obstruction has been passed.

This object and other advantageous ends I attain by means of the mechanism hereinafter described, reference to be had to the accompanying drawings, in which:—

Figure 1 is a plan view of the front of an automobile, with body removed, and my device operably connected therewith; and Figure 2 is a front elevational view of the chassis of the automobile showing the apron on either end of the bumper wings.

Referring now more particularly to the several figures of the drawing wherein similar reference characters indicate like parts in all of the views, the numeral 10 represents a lever which is mounted on a stud shaft 11 adapted to be journaled in the main frame 44 of an automobile; said lever 10 being operably connected with the hand wheel 13. A bushing 12 is shown around the shaft 11.

A ball lever 16 is mounted on the lever 10 at its support and co-axially therewith and said lever 16 terminates in a ball 17 to which is secured a link or connecting rod 18 which extends parallel with the main frame 44 of the automobile. A curved arm 20 extends from the rod 18, to which it is pivoted as at 19, and is secured on the knuckle joint 21 on the front axle 45 connecting the wheels 14 and 15.

Also secured to the knuckle joint 21 is a horizontally extending arm 24 and secured to the knuckle joint 22 a like horizontally extending arm 25; a transversely extending link or connecting rod 23 being pivoted to the upper ends of said arms 24 and 25 as particularly illustrated in Fig. 1 of the drawings. This is the conventional method of controlling the direction of the front wheels 14 and 15 from the rod 18.

This construction, as just described, provides a steering controlling device of the type set forth in Letters Patent #1,350,285 cited and the application being filed in the Patent Office as hereinbefore referred to. No claim is being made herein to the said steering controlling mechanism other than in combination with the bumper wing mechanism hereinafter described.

A main bumper frame 31 is secured to the front portion 30 of the automobile frame 44 in any suitable manner and is curved or bent inwardly at the sides thereof as at 32 and 33 in Fig. 1 so as to obtain resiliency in said bumper.

Wings 34 and 35 are provided on each side of the bumper frame 31, the same being pivoted in bosses or projections 38 and 39 on said frame 31.

Arms 26 and 27 are secured to the knuckles 21 and 22, respectively, and extend forwardly at an inwardly inclined angle, and link or connecting rods 28 and 29, respectively, are pivoted in the lower ends of said arms 26 and 27 and extend forwardly at an outwardly inclined angle to the bumper wings 34 and 35 on the main bumper frame 31; said rods 28 and 29 being pivoted as at 36 and 37, respectively.

The wheels 14 and 15 are each provided with the conventional hubs 40 and 41.

The bumper wings 34 and 35 are provided with the downwardly extending integral projections or aprons 42 and 43 at either end thereof and said wings 34 and 35 should extend outwardly slightly beyond the line of the hubs 40 and 41, as illustrated particularly in Fig. 2 of the drawings.

The operation of my device will be readily apparent; the steering controlling mechanism being in place on the car and connected with the knuckle joint 21 on the front axle 45 and my flexible bumper wing attachment being positioned on said car and rod connected to the said knuckle joint 21 and the opposite knuckle joint 22; said knuckle joints 21 and 22 being connected by the arms 24 and 25 and transverse connecting rod 23, when an obstruction is encountered by the wings of the bumper they will be forced rearwardly whereby the wheels 14 and 15 will be drawn inwardly away from the obstruction. The said wings 34 and 35 should extend outwardly slightly beyond the line of the hubs 40 and 41 so that an obstacle could not pass the said wings and contact with said hub. The aprons 42 and 43 are provided on the wings 34 and 35 so as to encounter obstacles of a height that would not reach to the average bumper.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit and scope of the invention or sacrificing any of its advantages.

Having thus described my invention what I claim as new and desire to secure by Letters Patent is:—

1. A bumper of the class stated, wings pivoted thereto and rods connecting said wings with the knuckle joints of the front axle of an automobile, substantially as described.

2. A bumper of the class stated, wings pivoted thereto and rods connecting said wings with the knuckle joints of the front axle of an automobile, said wings extending beyond the line of the hubs of the wheels of said automobile, substantially as described.

3. A bumper of the class stated, wings pivoted thereto, rods connecting said wings with the knuckle joints of the front axle of an automobile and downwardly extending aprons to said wings, substantially as described.

4. A bumper of the class stated, wings pivoted thereto, rods connecting said wings with the knuckle joints of the front axle of an automobile and downwardly extending aprons to said wings, whereby as an obstacle is encountered by said wings they will move rearwardly causing the front wheels of said automobile to move inwardly and away from the obstacle, substantially as described.

5. The combination with a steering controlling mechanism of the class stated operably connected to a knuckle joint of the front axle of an automobile, of a bumper connected to the front of said automobile, wings pivoted to said bumper, rods connecting said wings with the knuckle joints of the front axle of said automobile, and a rod connecting said knuckle joints, whereby as an obstacle is encountered by said wings they will move rearwardly causing the front wheels of said automobile to move inwardly and away from the obstacle; said steering controlling mechanism will cause said wheels to resume their former direction after the obstacle has been passed, substantially as described.

In testimony whereof I affix my signature.

JOSEPH HOFFMAN.